(12) United States Patent
Siraky et al.

(10) Patent No.: US 7,310,882 B2
(45) Date of Patent: Dec. 25, 2007

(54) MEASURING DEVICE

(75) Inventors: Josef Siraky, Donaueschingen (DE); Bernhard Wölfle, Bad Durrheim (DE)

(73) Assignee: Sick Stegmann GmbH, Donaueschingen (DE)

( * ) Notice: Subject to any disclaimer, the term of this patent is extended or adjusted under 35 U.S.C. 154(b) by 0 days.

(21) Appl. No.: 11/244,398

(22) Filed: Oct. 6, 2005

(65) Prior Publication Data
US 2006/0070250 A1 Apr. 6, 2006

(30) Foreign Application Priority Data
Oct. 6, 2004 (DE) .................. 20 2004 015 570 U

(51) Int. Cl.
*G01B 5/00* (2006.01)
(52) U.S. Cl. ....................... 33/1 PT; 33/775
(58) Field of Classification Search ............... 33/1 PT, 33/773, 778, 775, 779; 347/103, 104, 108; 73/514.39
See application file for complete search history.

(56) References Cited

U.S. PATENT DOCUMENTS

| | | | |
|---|---|---|---|
| 2,530,708 A | 11/1950 | Loewenthal et al. ......... 49/87.1 |
| 3,539,782 A | 11/1970 | Upshur | |
| 3,740,856 A * | 6/1973 | Culver ........................ 33/772 |
| 4,577,411 A | 3/1986 | Martin | |
| 4,700,484 A | 10/1987 | Frank et al. | |

FOREIGN PATENT DOCUMENTS

| | | | |
|---|---|---|---|
| DE | 271 248 A3 | 8/1989 |
| DE | 38 36 451 A1 | 5/1990 |
| DE | 42 12 636 A1 | 11/1993 |
| DE | 42 34 173 C1 | 3/1994 |
| GB | 2 342719 A | 4/2000 |

* cited by examiner

*Primary Examiner*—G. Bradley Bennett
*Assistant Examiner*—Tania C Courson
(74) *Attorney, Agent, or Firm*—The Nath Law Group; Jerald L. Meyer; Matthew J. Moffa

(57) ABSTRACT

Measuring device for measuring the path and/or speed of a moving object in relation to a structural component, with a measuring wheel (20) and with a rotary encoder (10), such that the measuring wheel (20) is coupled to the encoder shaft (16) of the rotary encoder (10) at a precise angle of rotation, and the measuring wheel (20), along with the contact surface (22) formed by its jacket, can be positioned on the object in such a way that the axis of the measuring wheel (X direction) runs basically perpendicular to the direction of motion (Z direction) of the object, and the measuring wheel (20) and the rotary encoder (10) are elastically mounted on the structural component in a direction (Y direction) that is basically perpendicular to the axis of the measuring wheel (X direction) and to the direction of motion of the object (Z direction), wherein the measuring wheel (20) and the rotary encoder (10) are positioned on an elastic arm (32) that exhibits two legs (34, 36), the elastic arm (32) is secured to the structural component with the end of one of the legs (34), the measuring wheel (20) and the rotary encoder (10) are attached to the end of the other leg (36), and one of the legs (34) can be deflected in what is essentially the Y direction and the other leg (36) can be deflected in what is essentially the X direction.

7 Claims, 5 Drawing Sheets

MEASURING DEVICE

Figure 1:
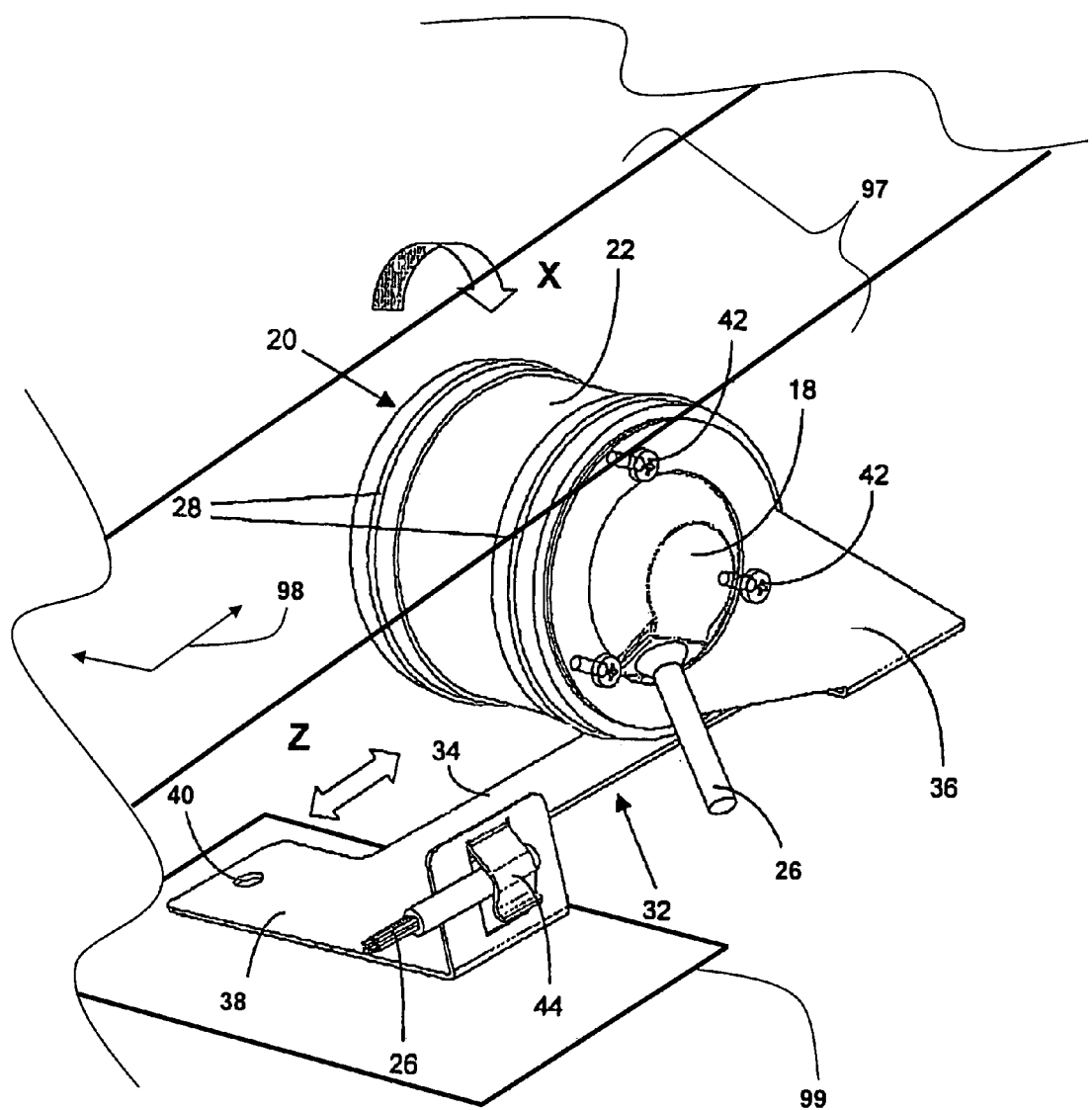

The invention relates to measuring device for measuring the path and/or speed of a moving object in relation to a structural component.

Measuring devices of this kind basically consist of a measuring wheel with a contact surface in the form of a cylindrical jacket and of a rotary encoder, such that the encoder wheel of the rotary encoder is coupled at a precise angle of rotation to the measuring wheel. Measuring devices of this kind are employed to measure the path and speed of moving objects relative to a structural part that is in fixed position, e.g., to measure the path and path of transport belts. With its contact surface the measuring wheel rests in frictionally engaged fashion on the object to be measured, and the rotating axis of the measuring wheel (X direction) runs at a right angle to the object's direction of motion (Z direction), e.g., the direction of motion of the transport belt. The movement of the object drives the measuring wheel, and the rotary encoder along with it. The rotary encoder and the measuring wheel are mounted on the structural component, e.g., on a machine frame. In order to achieve a measurement that is as slip-free as possible the rotary encoder and the measuring wheel are mounted perpendicular to the surface of the object (Y direction), i.e., basically perpendicular to the object's direction of motion (Z direction). Because of the spring mount the measuring wheel is pressed against the moving surface of the object being measured, thereby producing the frictional connection needed for a measurement that is as free of slippage as possible.

In the known measuring devices the spring mounting is realized with a large number of components, with the result that construction and assembly costs are considerable. Justification tolerances in the installation of the measuring wheel and/or areas of unevenness in the surface of the object being measured may create a condition such that the measuring wheel does not rest with the entire width of its contact surface on the object being measured, but only with the edge of its contact surface. When the measuring wheel has this kind of edge movement or operation the frictional connection between the measuring wheel and the object may be reduced, with the result that there is increased wear on the measuring wheel.

The invention is based on the problem of creating an improved measuring device with a simple construction.

This problem is solved by a measuring device exhibiting the following features.

Advantageous embodiments of the invention are also described below.

In accordance with the invention the rotary encoder with the measuring wheel are attached to an elastic arm, which exhibits two legs, such that one leg permits elastic deflection in the Y direction and the other leg permits elastic deflection in the X direction. Consequently the measuring wheel can adjust not only to areas of surface unevenness in the measured object in the Y direction; the elastic arm also permits pendular motion in the rotating axis of the measuring wheel in the X-Y plane, i.e., in the plane which runs perpendicular to the surface area of the measured object, which is the surface area on which the measuring wheel rests. The elastic action in the Y direction means there is a constant pressure exerted by the measuring wheel on the object being measured. The pendular movement ensures that the measuring wheel always rests with the entire width of its contact area on the surface of the object being measured and that the measuring wheel presses against the surface of the object at a uniform pressure over the entire width of its contact area. Edge movement or operation by the measuring wheel is thereby avoided, and slippage-determined errors in measurement are prevented, as is increased wear.

In one advantageous embodiment the elastic arm is designed as a single piece, such that the legs take the form of elastic blades positioned one against the other. The elastic blade of one leg basically rests on the X-Z plane and can be deflected in the Y direction. The elastic blade forming the other leg runs in the Y-Z plane and is set at angle to the first elastic blade and can basically be deflected in the X direction.

For a simple and cost-effective production it is advantageous if the elastic arm is produced from elastic sheet metal as a punched bending part, ideally from elastic sheet steel.

The elastic arm can be secured to the structural component with the end of one of its leg. The second leg is positioned on the free end of the first leg and is bent at a right angle relative to that leg. The rotary encoder and the measuring wheel are positioned on the free end of the second leg.

Since the pendular mount assures that the measuring wheel rests reliably, over the entire width of its contact surface, on the surface of the object being measured the contact surface of the measuring wheel may be designed so as to have a large width. A large width for the contact surface, i.e., a large axial width in the measuring wheel, thereby favors the uniform exertion of pressure over the entire width of the contact surface of the measuring wheel. When the contact wheel is designed so as to have a large axial width an advantageous possibility emerges—that of designing the contact wheel as a hollow cylinder, inside of which the rotary encoder may be positioned. This combines the advantage conferred when the contact surface of the measuring wheel rests over a large width, with the result that there is a good frictional connection between the measuring wheel and the object being measured, and the advantage conferred by an extremely compact design for the measuring device.

The design of the elastic arm with two legs formed as elastic blades also has the specific advantage of optimizing the spring-like characteristics of the elastic arm. Specific dimensions given to the leg that can be deflected in the Y direction, namely the width, length, and material strength of the leg, will allow the pressure exerted by the measuring wheel on the object being measured to be predetermined and defined. The spring properties of the leg that can be deflected in the X direction define the pendular properties of the axis of the measuring wheel. The elastic blades of the legs each exhibits an extremely high degree of rigidity in the plane that it occupies. This means that the elastic arm as a whole has an extremely high degree of rigidity vis-à-vis deflections in the Z direction, independent of deflections in the Y direction and the X direction. The measuring wheel is consequently kept very stabile in the Z direction, i.e., in the direction of the motion of the object being measured, with the result that, due to the elastic mounting, the measuring accuracy in the Z direction is not impaired.

The invention is next described in greater detail on the basis of an exemplary embodiment depicted in the drawing. Shown are:

FIG. 1 the measuring device in a perspective view

Figure 2:
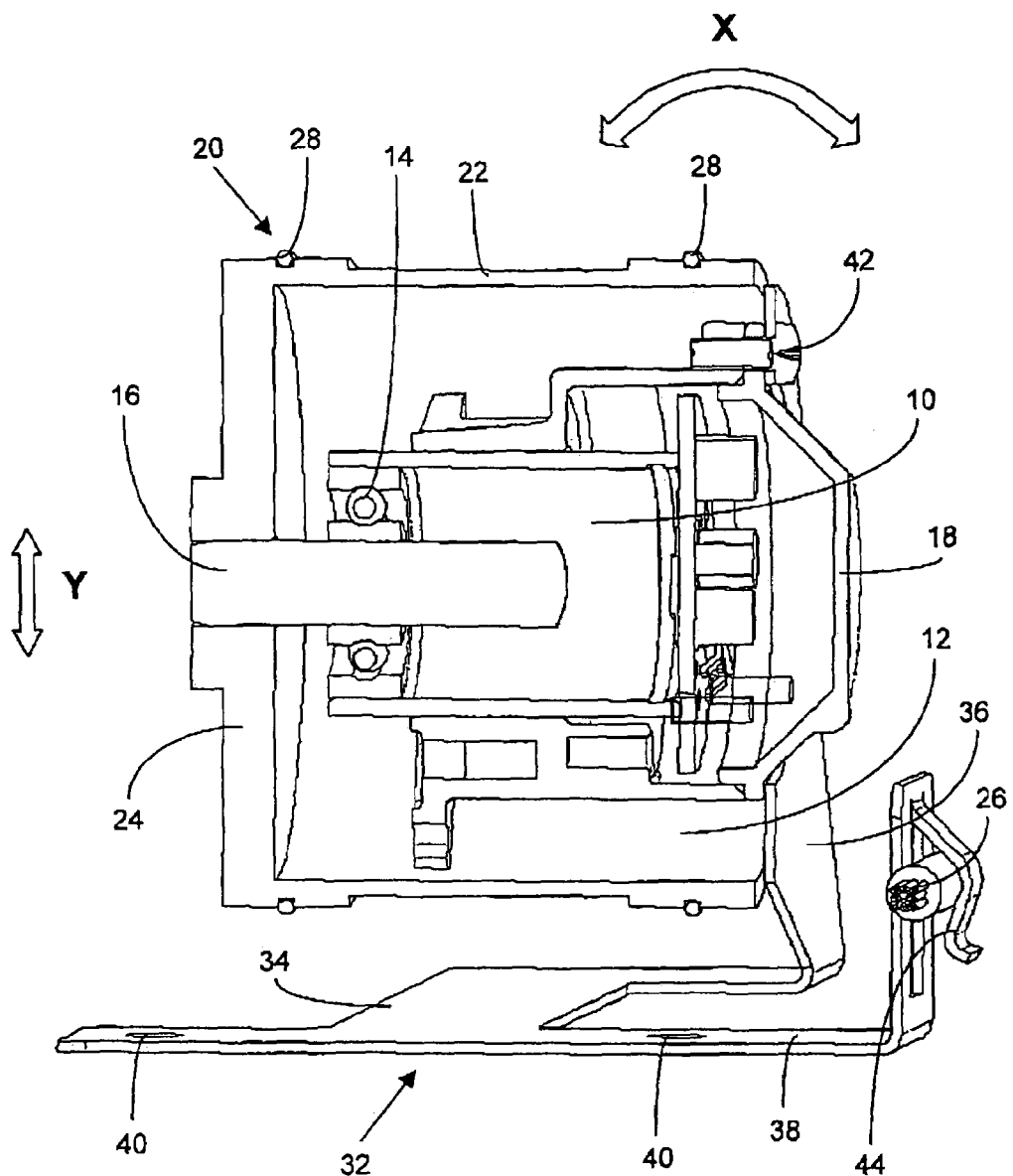

FIG. 2 the measuring device in partial section

Figure 3:
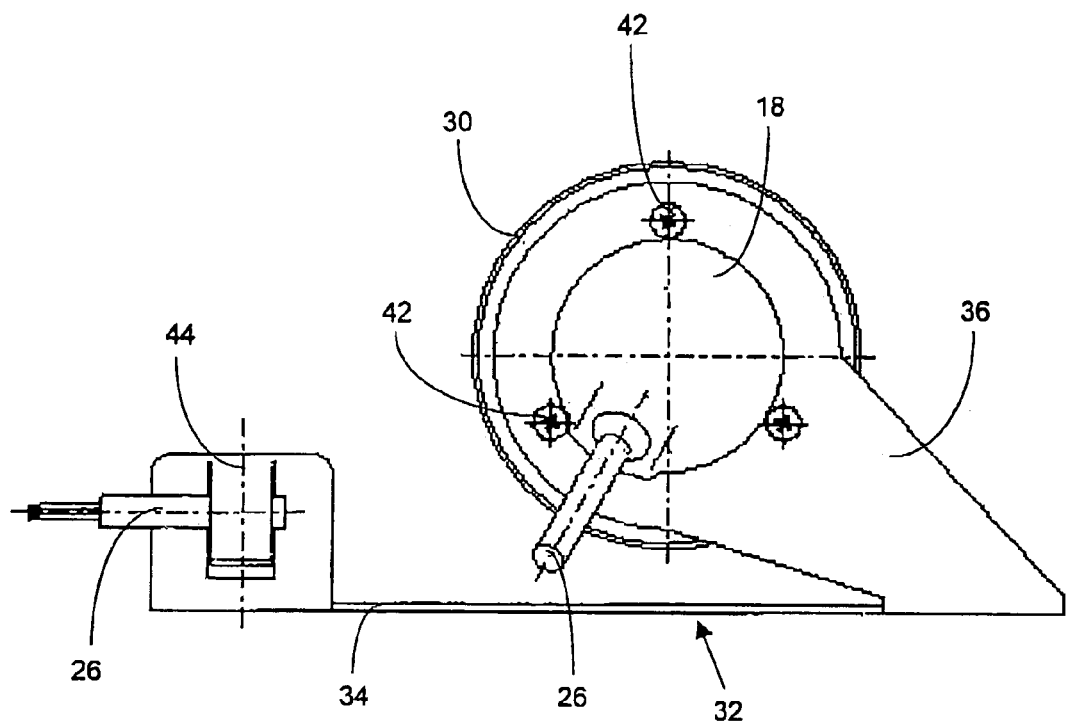

FIG. 3 a lateral view of the measuring device in the X direction

Figure 4:
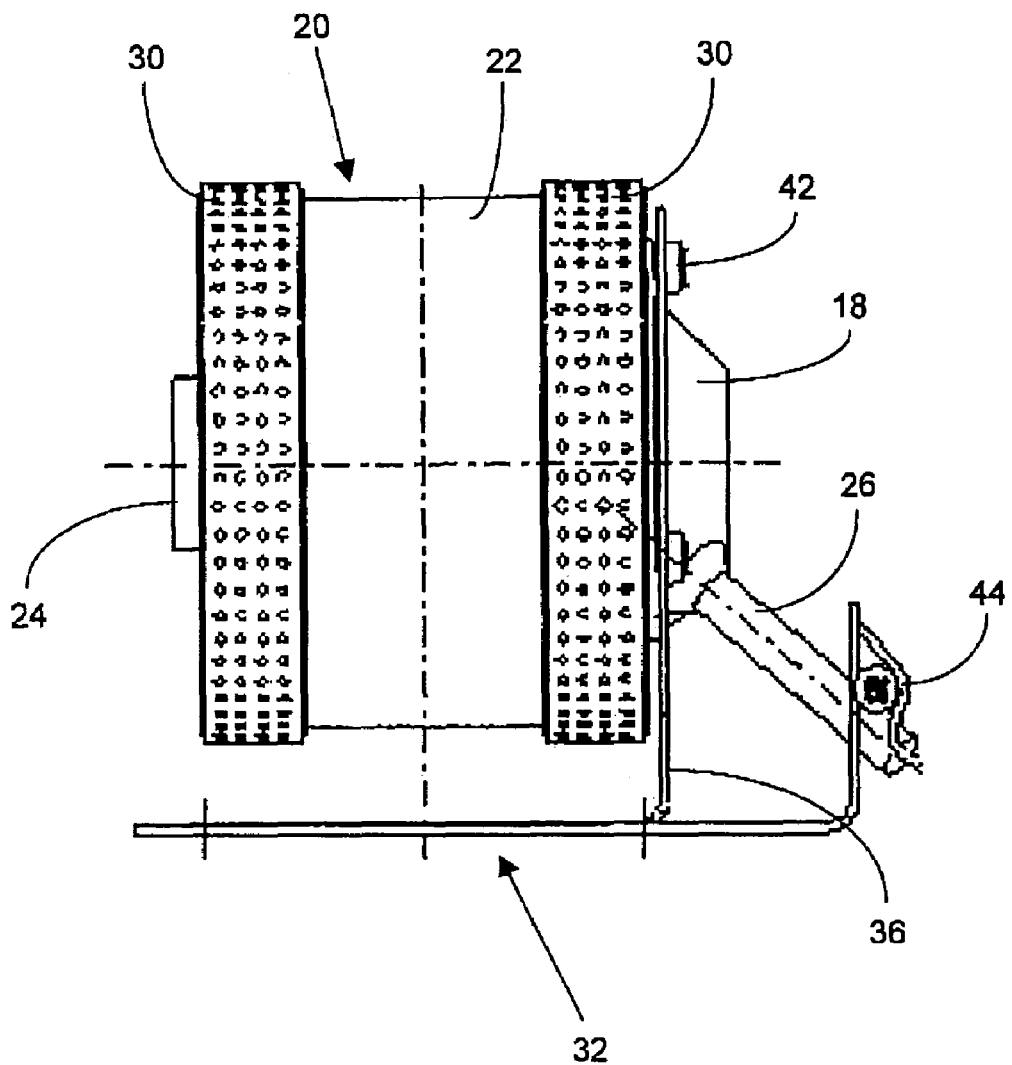

FIG. 4 a lateral view of the measuring device in the Z direction

Figure 5:
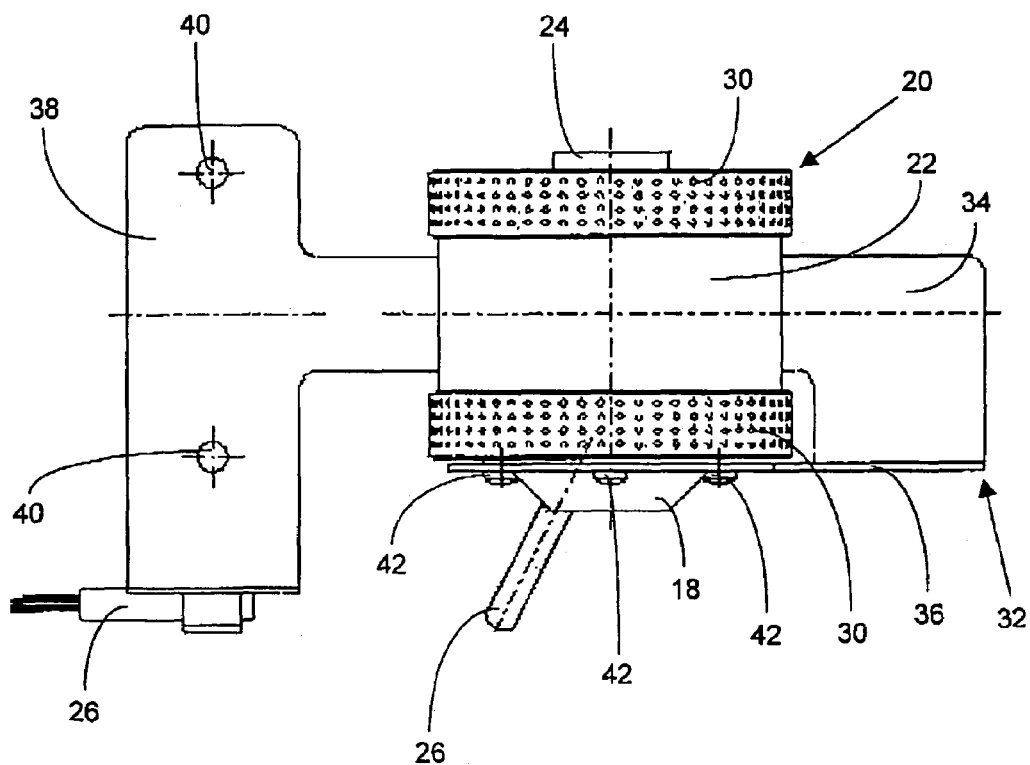

FIG. 5 a top view of the measuring device from the Y direction

The measuring device exhibits a rotary encoder 10, which is designed in a manner known to the prior art. The rotary encoder 10 may be an optical, magnetic, or inductive rotary encoder and may take the form of an absolute or incremental encoder. The rotary encoder 10 exhibits a housing 12, in which an encoder shaft 16 is mounted in coaxially rotating fashion by means of a ball bearing 14. The encoder shaft 16 drives a material measure, which is scanned by a scanner secured in the housing. The housing 12 is sealed by a lid 18 on its side opposite the entrance side of the encoder shaft 16.

A measuring wheel 20, which may be produced, e.g., from plastic, but will ideally be produced from metal, particularly aluminum, is designed as a hollow cylinder. The measuring wheel 20 consequently consists of a circular cylindrical jacket, which serves as the contact surface 22. The hollow cylinder of the measuring wheel 20 is sealed on one of its axial sides by a base 24. The rotary encoder 10 is inserted coaxially into the measuring wheel 20 and is coaxially encased by the measuring wheel. The base 24 of the measuring wheel 20 rests concentrically on the encoder shaft 16 and is torque proof. The measuring wheel 20 rotates freely around the rotary encoder in coaxial fashion, in such a way that the rotary encoder measures the angular position of the measuring wheel 20, which is mounted on the encoder shaft 16, relative to the housing 12. The rotary encoder 10 is connected to a cable 26, which acts as a power source for the rotary encoder 10 and serves the exchange of data between the rotary encoder 10 and an external data processing component.

The measuring device is positioned with the contact surface 22 of the measuring wheel 20 on the moving surface 98 of the object 97 being measured. The measuring wheel 20 is set in rotating motion by the moving object 97. In order to achieve a good frictional connection between the contact surface 22 and the surface 98 of the object 97 being measured, contact rings are provided on the two axial ends of the contact surface 22, specifically on the outside jacket of the contact surfaces 22. In the exemplary embodiment shown in FIGS. 1 and 2 these contact rings take the form of rubber rings 28, which are pulled onto the outer circumference of the contact surface 22. In the exemplary embodiment shown in FIGS. 3 to 5 the contact rings take the form of an elevated knurl 30 on the circumference of the contact area 22. The contact rings 28 and 30 allow the measuring wheel 20 to sit on its two axial rim areas, with the result that the entire width of the contact area 22 is reliably utilized.

The measuring device is secured to a structural component 99 which serves as a reference system for the movement of the object being measured. Ideally this component will be one that is fixed in place locally, e.g., a machine stand relative to which the object being measured moves.

An elastic arm 32 serves to secure the measuring device. The elastic arm 32 has a first leg 34 and a second leg 36. The legs 34 and 36 are each designed as flat elastic blades, which have a high degree of rigidity along their plane, but can be deflected in spring-like, elastic fashion perpendicular to their plane. In the depicted exemplary embodiment the entire elastic arm 32, with its legs 34 and 36, is produced as a single-piece elastic part punched from elastic sheet metal, particularly elastic sheet steel.

At one end of the elastic arm 32, i.e., at one end of the first leg 34, a fastening strip 38 is designed to form a single piece with the sheet metal of the elastic arm 32. The fastening strip 38 exhibits two holes 40, which allow the fastening strip 38 to be screwed to the structural component.

When the measuring device is mounted the first leg 34 runs from the end of the elastic arm designed as a fastening strip 38 onwards in the Z direction, i.e., it runs in the direction of motion of the measured object that is in contact with the measuring wheel. On the free end of the first leg 34, which lies away from the fastening strip 38, the second leg 36 is positioned as a single piece on one of lateral longitudinal rims of the first leg 34, and is bent at a right angle to the plane of the first leg 34. On its open side the second leg 36 exhibits a circular punching, and the leg 36 takes the form of an annular ring that is concentric to this punching. The housing 12 of the rotary encoder 10 is secured to this annular area of the second leg 36 by means of screws, in such a way that the rotary encoder 10 is positioned in coaxial fashion relative to the circular punching and such that the lid 18 of the housing 12 reaches through the circular punching. The annular area of the second leg 36 seals the annular gap between the housing 12, along with the lid 18, and the contact surface 22 of the measuring wheel 20, in order to thereby protect the interior of the measuring wheel 20 and the rotary encoder 10 from the environment, which is often laden with dirt, moisture, and the like.

As can be best seen in FIG. 3, the second leg 36, and the plane it occupies as an elastic blade, is tilted at an acute angle toward the end of the elastic arm 32 that permits fastening. The rotary encoder 10, with the measuring wheel 20 that coaxially encloses it, is positioned on the side of the second leg below which the first leg 34 is located. In this design the rotary encoder 10 and the measuring wheel 20 are positioned roughly above the center of the first leg 34, so that compact external dimensions, which are advantageous for the installation of the device, can be maintained for the entire measuring device.

The cable 26 for connecting the rotary encoder 10 runs through the lid 18 and outwards and can be secured to a clamping bracket 44 that is bent upwards at a right angle from the fastening strip 38.

To mount the measuring device the elastic arm 32 is secured with its fastening strip 38 to a structural component, ideally a stationary component, e.g., a machine stand. The elastic arm 32 is mounted in such a way that the first leg 34 runs in the Z direction, which is the direction of motion of the object being measured relative to the fixed structural component. The first leg 34 permits the elastic deflection of the rotary encoder 10 and the measuring wheel 20 in the Y direction, which runs perpendicular to the moving surface of the object being measured; this is the surface on which the measuring wheel 20 rests with its contact area 22. The spring force of the first leg 34 in the Y direction causes the measuring wheel 20 to press against the object being measured, e.g., with a pressure force of about 5N. The measuring wheel 20 can adapt to cases of unevenness in the surface of the object through deflection of the first leg 34 in the Y direction. The second leg 36 permits deflection of the axis of the rotary encoder 10 and the measuring wheel 20 in the X direction, which is the axial direction of the measuring wheel and which runs perpendicular to the Z direction and the Y directions. The deflection of the second leg 36 in the X direction brings about an oscillation of the second leg 36 based at the flexible edge where the second leg 36 rests on the first leg 34. This oscillating movement, which is indicated by the arrow X in FIG. 1, corresponds to a pendular movement of the axis of the measuring wheel 20 in the Y-Z plane. Because of this spring-like, pendular suspension of the measuring wheel 20, the contact area 22 of the measuring wheel 20 can adjust in the X direction to inclinations on the surface of the object being measured, i.e., in a direction at right angles to the object's direction of motion. This ensures that the contact area 22 and its contact rings 28 and 30 always rest with a frictional connection on the surface of the object being measured.

In the Z direction, which is the direction of movement of the object being measured, both the first leg 34 and the second leg 36 of the elastic arm 32 have a flat shape and thus have a very high degree of rigidity. Consequently the elastic arm 32 does not permit the axis of the measuring wheel 20 to move in the Z direction, i.e., in the direction of motion of the object being measured. Such movement by the measuring wheel 20 might impair the accuracy of the measuring device.

LIST OF REFERENCE SYMBOLS

- 10 rotary encoder
- 12 housing
- 14 ball bearing
- 16 encoder shaft
- 18 lid
- 20 measuring wheel
- 22 contact area
- 24 base
- 26 cable
- 28 rubber rings
- 30 knurl
- 32 elastic arm
- 34 first leg
- 36 second leg
- 38 fastening strip
- 40 holes
- 42 screws
- 44 clamping bracket

The invention claimed is:

1. Measuring device for measuring the length, speed, or length and speed of a moving object in relation to a structural component, said measuring device comprising:
    a measuring wheel; and
    a rotary encoder, such that the measuring wheel is coupled to the encoder shaft of the rotary encoder at a precise angle of rotation, and the measuring wheel, along with a contact surface of the measuring wheel, can be positioned on the object in such a way that the axis of the measuring wheel (X direction) runs basically perpendicular to the direction of motion (Z direction) of the object, and the measuring wheel and the rotary encoder are elastically mounted on the structural component in a direction (Y direction) that is basically perpendicular to the axis of the measuring wheel (X direction) and to the direction of motion of the object (Z direction),
    wherein
    the measuring wheel and the rotary encoder are positioned on an elastic arm that exhibits a first leg and a second leg, the elastic arm is secured to the structural component with the end of the first leg, the measuring wheel and the rotary encoder are attached to the end of the second leg, and the first leg can be deflected in what is essentially the Y direction and the second leg can be deflected in what is essentially the X direction,
    wherein the first leg and the second leg of the elastic arm are designed as elastic blades, and
    wherein the elastic blade of the second leg is positioned at essentially a right angle to the free end of the elastic blade of the first leg.

2. Measuring device according to claim 1, wherein the elastic arm is a single-piece elastic part punched from elastic sheet metal.

3. Measuring device according to claim 1, wherein a fastening strip is so formed as to create a single piece with the end of the first leg, in order permit the measuring device to be fastened to the structural component.

4. Measuring device according to claim 1, wherein the measuring wheel is designed as a hollow cylinder which encloses the rotary encoder coaxially.

5. Measuring device according to claim 4, wherein a housing of the rotary encoder is secured to the elastic arm by one of the sides of said housing, and the measuring wheel is supported in torque-proof fashion by the encoder shaft projecting out of the housing on the opposite side.

6. Measuring device according to claim 4, wherein the contact area of the measuring wheel comprises two contact rings spaced axially on its outer circumference.

7. Measuring device according to claim 1, wherein the elastic arm permits pendular motion about an axis basically perpendicular to a surface of the object.

* * * * *